UNITED STATES PATENT OFFICE.

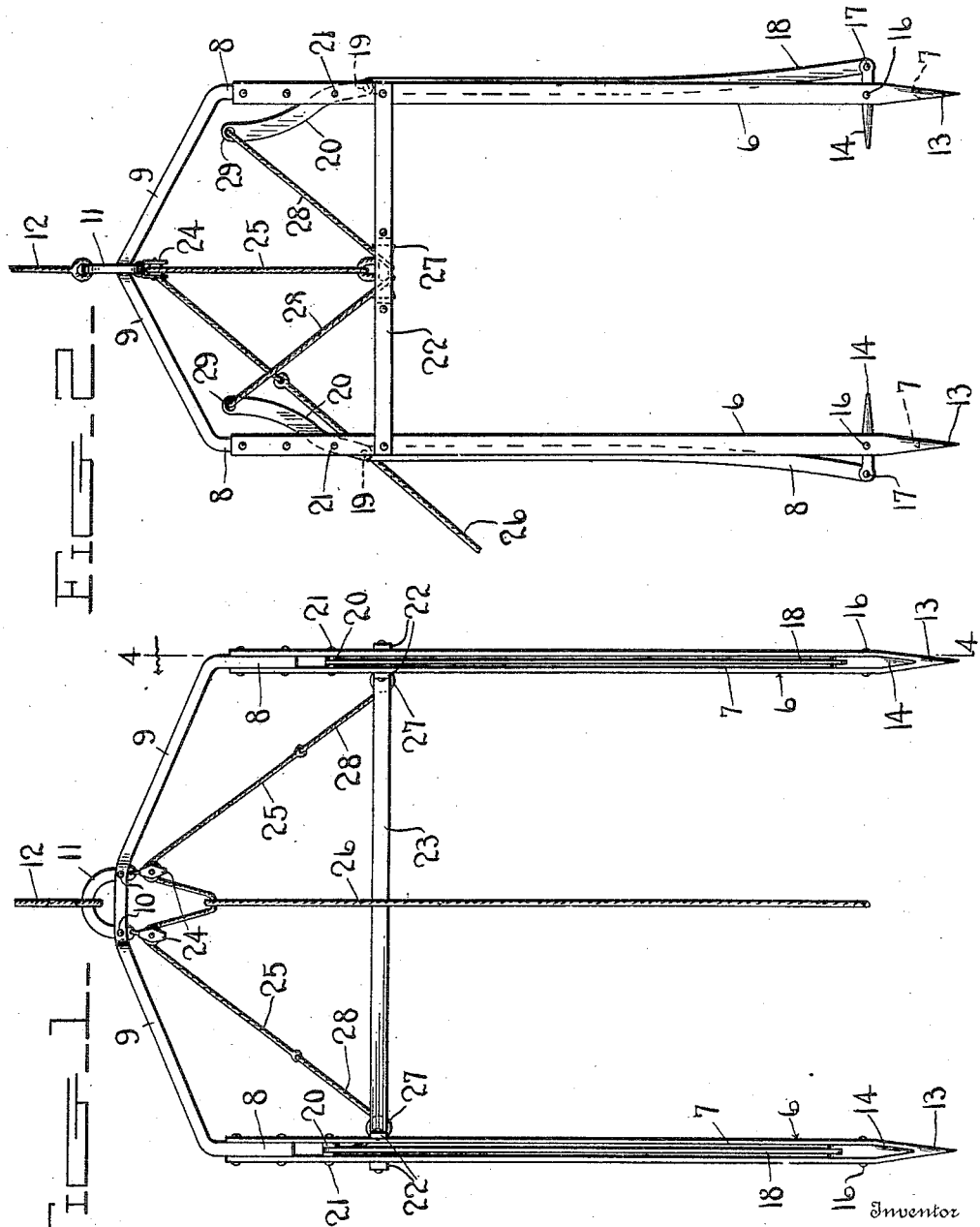

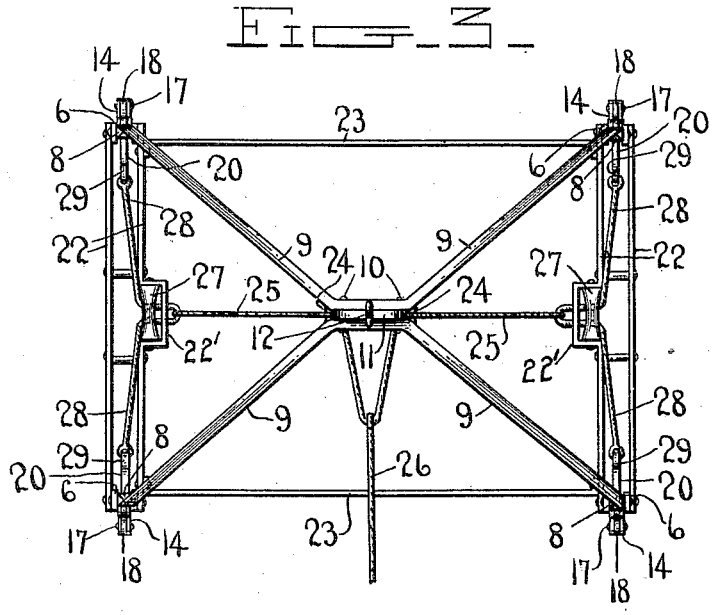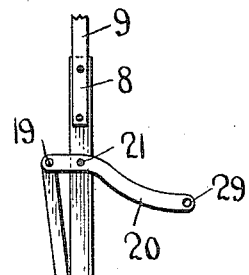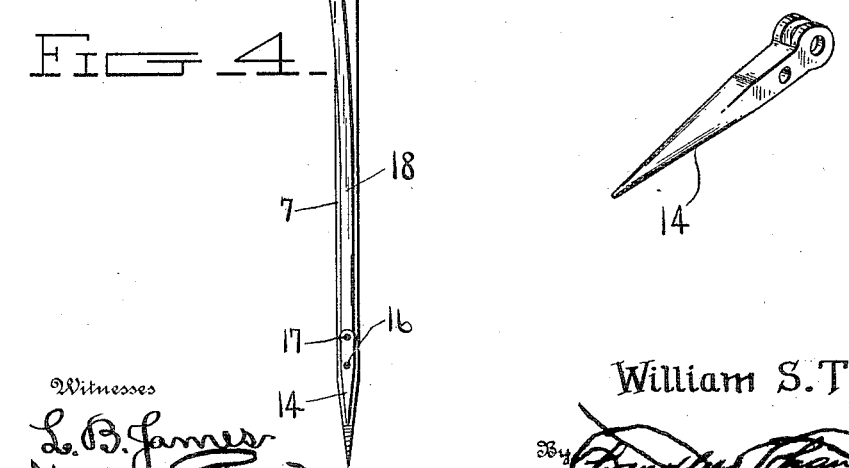

WILLIAM S. THOMPSON, OF WYANET, ILLINOIS.

HAY-FORK.

971,324.  Specification of Letters Patent.  Patented Sept. 27, 1910.

Application filed March 16, 1909. Serial No. 483,752.

*To all whom it may concern:*

Be it known that I, WILLIAM S. THOMPSON, a citizen of the United States, residing at Wyanet, in the county of Bureau, State of Illinois, have invented certain new and useful Improvements in Hay-Forks; and I do hereby declare the following to be a full, clear, and exact description of the invention, such as will enable others skilled in the art to which it appertains to make and use the same.

The invention relates to a hay fork and more particularly to the class of harpoon hay forks for lifting or raising hay or other material.

The primary object of the invention is the provision of a hay fork of this character in which hay or other material will be gathered in large quantity when inserted therein for properly lifting the said quantity and will also automatically wedge its load in place within the fork during the lifting or hoisting thereof.

Another object of the invention is the provision of a hay fork of this character which will readily and easily gather a quantity of hay or other material to lift the same without the possibility of accidental dropping of the load from the fork when in the act of hoisting, and means to permit the ready and quick release of the load after having been hoisted to a predetermined point.

Another object of the invention is the provision of a hay fork which is simple in construction, durable, efficient in operation and inexpensive in the manufacture.

With these and other objects in view, the invention consists in the construction, combination and arrangement of parts as will be hereinafter more fully described in detail, illustrated in the accompanying drawings and brought out in the claim hereunto appended.

In the drawings:—Figure 1 is a side elevation of the invention. Fig. 2 is an end elevation with the harpoon prongs or barbs in position to retain a load. Fig. 3 is a top plan view. Fig. 4 is a sectional view on the line 4—4 of Fig. 2. Fig. 5 is a perspective view of one harpoon tooth.

Similar reference characters indicate corresponding parts throughout the several views in the drawings.

In the drawings the numeral 6 designates pairs of spaced oppositely located tines provided with longitudinal slots 7 extending nearly the entire length thereof and at one end the said tines are united with downwardly disposed extremities 8 of inwardly curved head bars 9 united to each other by fasteners 10, which latter also connect centrally between the bars an eye 11 rising vertically therefrom and to which is connected the ordinary lifting rope or cable 12 in the usual manner.

Secured to the free extremities of the tines 6 are spear points 13 that are adapted to be speared into a bunch or load of hay or other material when the fork is being loaded. Adjacent to the spear points 13 the tines 6 have pivotally mounted within the lower ends of the longitudinal slots 7 therein pivotal harpoon prongs or barbs 14, which latter are pivoted intermediate their ends by pivot pins 15 and are provided with tapered pointed ends 16 that are designed to be turned flush within the lower extremities of the slots 7 so as to lie within the planes of the spear points 13 and thereby allow the tines to freely enter the load or bunch of material. The outer ends of the harpoon prongs or barbs 14 have pivotally connected thereto as at 17 one end of adjusting links 18, which work within the plane of the longitudinal slots and are pivotally connected at their other ends as at 19 to the outer extremities of trip levers 20. The said trip levers are oppositely located and are respectively pivoted between their ends on the pins 21 within the slots 7 in the said tines. Uniting the spaced tines in pairs are spaced cross bars 22, the latter disposed below and out of the path of movement of the trip levers. Connecting the united pairs of tines are brace bars 23 so as to form a rigid unitary structure. The inner brace bars 22 are centrally formed with U-shaped yokes 22' for a purpose as will be hereinafter described.

Depending centrally from the cross head bars 9 are a pair of pulleys 24 over which are trained branches 25 of a trip rope or cable 26, which branches are also trained over rollers 27 journaled centrally between the spaced cross bars 22 in the yokes 22' and terminate each in a pair of extremities 28 connected to eye terminals 29 of the trip levers. These rollers are provided with concaved peripheries so as to prevent the rope extremities 28 from overriding the said rollers at opposite ends thereof. The trip levers are adapted to work between the tines and are under the control of an operator through the medium of the trip cable 26, which latter is adapted to be actuated for tripping or retracting the harpoon prongs or barbs 14 when it is desired to trip the fork of its load.

What is claimed is:—

A device of the class described comprising inwardly converging inverted U-shaped bars, a hanger loop centrally between the said bars, bolts passed through the bars and hanger loop for uniting the same together, tines depending from the ends of the bars and fixed thereto, each tine being provided with a slit throughout a greater portion of its length, harpoon teeth pivoted to forward tines near the lower end of the slits therein, levers centrally pivoted in said tines near the upper ends of the slits therein, link rods connecting said levers and teeth, and end brace bars connected to the inner and outer faces of the tines near their upper ends, the said bars being in alinement with each other, side brace bars connected to the tines near their upper ends, yokes formed centrally in the inner end brace bars, rollers journaled in said yokes, each roller being provided with a convexed periphery, ropes connecting the levers in pairs and trained over said rollers, pulleys carried at the ends of the hanger loop and depending centrally between the tines, and a pull cable trained over the pulleys and connected with said ropes.

In testimony whereof, I affix my signature, in presence of two witnesses.

WILLIAM S. THOMPSON.

Witnesses:
 GEO. S. SKINNER,
 JENNIE EARNEST.